Feb. 28, 1933.   W. H. ROSS   1,899,484
DISPENSING CABINET
Filed Feb. 19, 1931
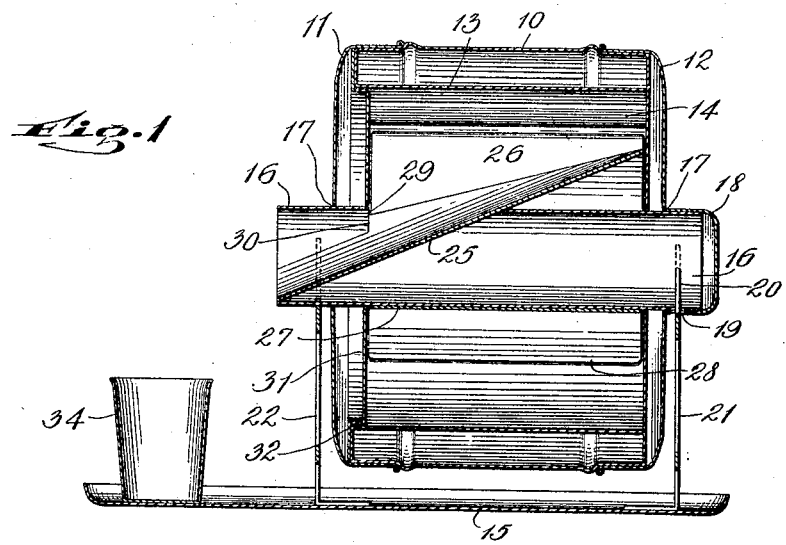
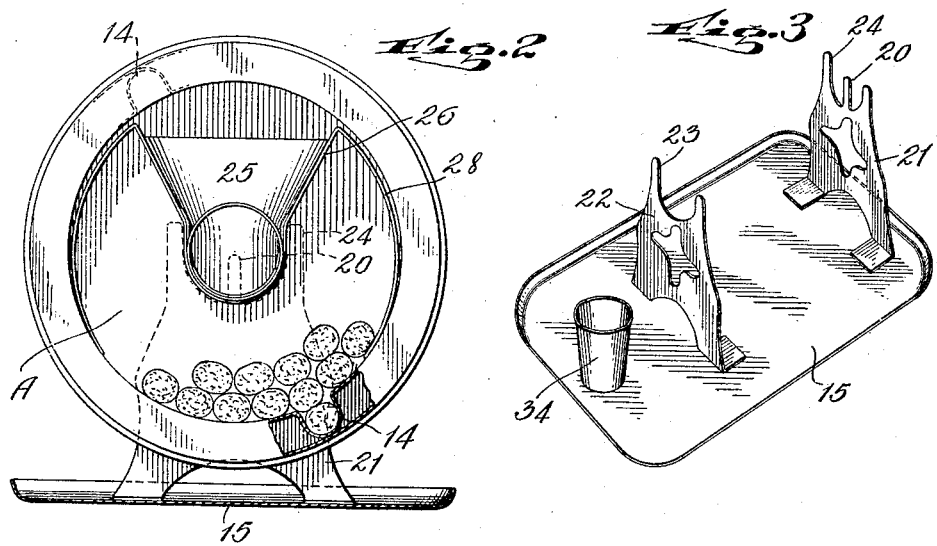
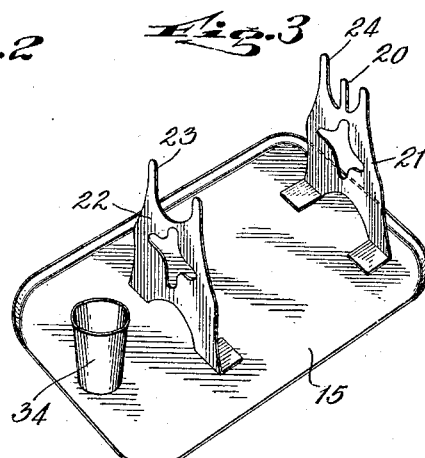
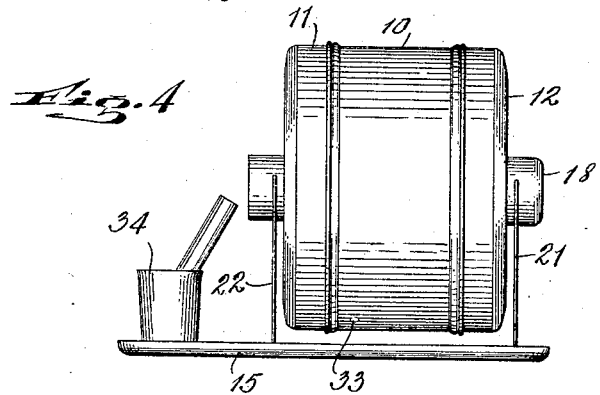
INVENTOR.
WILLIAM H. ROSS
BY Meyers & Jones
ATTORNEYS.

Patented Feb. 28, 1933

1,899,484

UNITED STATES PATENT OFFICE

WILLIAM H. ROSS, OF BROOKLYN, NEW YORK, ASSIGNOR OF ONE-HALF TO VICTOR NIVOIS, OF NEW YORK, N. Y.

DISPENSING CABINET

Application filed February 19, 1931. Serial No. 517,019.

My invention relates to cabinets for containing and dispensing cigarettes and articles of similar form.

An important object of my invention is to provide a container for cigarettes with means for delivering or dispensing them one at a time and to so construct and arrange the delivering means that there will be no possibility of the apparatus failing to make delivery of cigarettes as long as there is a supply therein. I have accomplished this object by providing the container with means to carry articles to a delivery chute supported within the casing between the walls of a guiding member so arranged as to carry the article to the chute when the carrier means is positioned thereabove without any possibility of the carrier passing the walls and chute without delivering the article thereto; and by arranging the chute relative to an outlet from the cabinet so that the article may pass freely therefrom.

Another object of the invention is to provide a receptacle to catch the articles delivered from the cabinet and to support the cabinet and delivery chute relative to said receptacle so that the cabinet may be removed and replaced at will without disturbing the predetermined relative position of the cabinet and chute relative to said receptacle.

Another object of the invention is to provide means for indicating when an article is about to be delivered from the cabinet.

Another object of the invention is to provide a cabinet of the above character which is comparatively cheap to manufacture, attractive in appearance, and of simple and practical construction from the stand point of manufacture, operation and durability.

The foregoing and other objects and advantages of the invention will become apparent and be specifically referred to during the following detail description of the accompanying drawing, in which:

Fig. 1 is a central vertical longitudinal view through the cabinet and support.

Fig. 2 is an end elevation of the cabinet shown in Fig. 1 with the end closure removed, parts broken away, and the tray in section.

Fig. 3 is a perspective view of the support, and

Fig. 4 is a side elevation of the cabinet and support showing a cigarette just delivered from the cabinet.

Referring to the drawing the numeral 10 designates a cylindrical casing the ends of which are closed by a removable cover 11, and a preferably fixed cover 12. An article receiving and carrying member 13 is fixedly secured to the casing 10 in spaced relation thereto and is provided with depressions or grooves 14 of dimensions to accommodate the cigarette or article to be dispensed. The casing 10 and carrier 13 are rotatably mounted above the tray by means of trunnions 16 which extend through openings 17 in the covers 11 and 12. As mentioned, the cover 12 is preferably fixed and not removable and this is effected by securing a cap 18 to the end of the member 16 outside of the cover 12 by solder or other means with its edges abutting the surface of the cover. An opening 19 through the cap 18 and member 16 receives the upstanding prong 20 on standard 21 for purposes to be hereinafter explained. A standard 22 is mounted on the tray 15 in fixed spaced relation to standard 21 and has a niche 23 normally occupied by trunnion 16 and alined with niche 24 on standard 21 normally occupied by cap 18. The cabinet is thus horizontally supported for rotation above tray 15, so that cigarettes or like articles can be carried one at a time in grooves 14 to the delivering chute 25, which is inclined through the front trunnion 16 and upwardly and backwardly therefrom between the flaring walls 26 of the member 27 which is fixedly secured to the member 16 by solder or other suitable means. This member 27 has wings 28 extending downwardly along and in proximity to the walls of carrier 13 to provide a chamber A within the cabinet to receive the cigarettes or other articles, and the member 27 being of approximately the same length as grooves 14. The wings 28 will retain the cigarette or article in the groove when the cabinet is rotated in either direction, until the groove is disposed above the flaring walls 26 and chute 25.

Referring to Fig. 1, it will be noted that the member 16 is cut away at 29 to provide a clearance for articles coming down the chute to pass freely out of the front of the member 16, and the chute is cut away at 30 in alinement with 29 and the inner wall 31 of cover 11 which is also provided with an annular shoulder 32 to frictionally engage the wall of carrier 13. The inner wall 31 is positioned to accurately retain the cigarettes in chamber 18 in position to fall one at a time in grooves 14 as the casing is rotated.

I prefer to construct the cabinet and support from stamped metal parts, appropriately decorated, and an indicator or mark 33 is provided on the exterior of the cabinet at a point relative to the grooves 14 where it will appear at a given place, for instance, directly above the trunnion 16, just as a cigarette is delivered to the chute 25.

A cup or receptacle is positioned in front of the chute and trunnion 16 so that a cigarette coming from the chute will be deposited in the cup as shown in Fig. 4.

The supporting standards are arranged so that the prong 20 is substantially in alinement with the center of the niche 23 and cup 34 and spaced relative to each other to receive the trunnions extending beyond the ends of the casing to accurately position the chute to deliver a cigarette into the cup. Assuming that the device is furnished assembled as shown in Fig. 1, the purchaser merely lifts the casing off of the supporting standards, removes the closure 11, inserts cigarettes into the chamber A, replaces the closure 11 and positions the casing on the supporting standards by simply inserting the prong 20 in the opening 19 and letting the trunnions come to rest within the niches 23 and 24. Rotation of the container in either direction will cause one of the grooves 14 to move under the cigarettes in the chamber 29 so that one of them will gravitate into the groove and be carried upwardly thereby upon continued rotation of the cabinet. The arrangement of the flaring walls 26 providing a relatively large open area facilitates delivery of the cigarettes to the inclined chute 25 tapering to its narrowest width through the trunnion 16.

It will be noted by reference to Figs. 1 and 2 that there is ample space at all points below the top of the wings 28 between the walls 26 for the cigarette to pass down the chute through the trunnion 16 and into the cup 34. As has been mentioned, the marker 33 will appear at a given point just in advance of delivery of a cigarette or similar article so that if no cigarette is delivered just after the marker has passed this point, the user knows that the supply is exhausted as there is no possibility of cigarettes jamming or failing to deliver from the groove 14 to the chute 25 under the construction and arrangement provided by the invention. The member 16 and parts fixedly associated therewith such as 27, 25 and 18 are maintained against rotation by the prong 20 and opening 19 and the casing freely rotates about this member 16 the ends of which constitute trunnions or bearings for the closures through which they extend.

It should be obvious that instead of a single prong 20, I could provide two similar upstanding prongs to permit removal and replacing of the casing on the supporting standards by single lifting or lowering operation, and that numerous other variations and alterations might be made without departing from the scope of the invention as hereinafter claimed.

I claim:

1. A device for containing and dispensing cigarettes and similar articles comprising a cylindrical casing having longitudinal article receiving grooves in its inner walls, closures for the ends of said casing, a tubular support mounted through said casing with its ends projecting outwardly through said closures, one end of the tubular support being open and a portion of the top of the support being cut away adjacent said open end, a guide for the articles to be dispensed connected to said support, walls of said guide flaring outwardly from adjacent said support towards the top of the casing, a chute mounted in inclined position between said walls and extending through the cut away portion of the tubular support, with its lower end disposed in the open end thereof, standards for holding the casing above a supporting surface, and means for holding the tubular support and chute against rotation and permitting rotation of said casing.

2. A device for containing and dispensing cigarettes and similar articles comprising a cylindrical casing having longitudinal article receiving grooves in its inner walls, closures for the ends of said casing, a tubular support mounted through said casing with its ends projecting outwardly through said closures, the end of the tubular support disposed through the front closure being open, and a portion of the top of said support within the casing and behind said front closure being cut away, a guide for the articles to be dispensed connected to said support, walls of said guide flaring outwardly from adjacent said tubular member towards the top of the casing, a chute mounted in inclined position between said walls and extending through the cut away portion of the tubular support, an end of said chute being disposed through the forward end of the tubular support and being reduced in size from the inner wall of the front closure, and means for rotatably mounting said casing above a supporting surface with said tubular member, guide and chute maintained against rotation.

3. A device for containing and dispensing cigarettes and similar articles comprising a cylindrical casing having article receiving grooves in its inner walls, closures for the ends of the casing, a supporting member mounted through the casing and having ends projecting through the closures, a cap fixed to one end of said member with its inner edge abutting the outer surface of one of the closures, and registering openings through said cap and end of the supporting member, a delivery chute supported within the casing by said supporting member and having its forward end extending through the other closure, supporting standards to receive the ends of said tubular member, and an upstanding prong on one of said standards engageable through said registering openings in the cap and end of the supporting member to maintain said supporting member and chute against rotation and to properly position the chute for delivery of articles from the casing.

4. A device for containing and dispensing cigarettes and similar articles comprising a cylindrical casing having longitudinal article receiving grooves in its inner wall, closures for the ends of the casing, a tubular support mounted through said casing with its ends projecting outwardly through said closures, a portion of the tubular support within the casing adjacent the front closure being cut away, a guide for the articles to be dispensed connected to the tubular support, and having upwardly and outwardly flaring walls extending from opposite sides of the support toward the top of the casing, downwardly curved wings depending from the tops of said flaring walls, a chute mounted between said upwardly and downwardly flaring walls with its top above the tubular support and adjacent the back closure and inclined through said cut away portion of the tubular support with its front edge adjacent the forward end of the tubular support, the forward lower portion of said chute between the front edge of the cut away portion of the support and the front end of the tubular support being reduced and disposed within the front end of the tubular support, standards for holding the casing above the supporting surface, and means on said standards and the ends of said tubular support for maintaining said support against rotation.

5. A dispensing receptacle comprising a cylindrical casing having spaced concentric walls with longitudinal grooves in the inner wall, closures for the ends of said casing, one of said closures being removable and having spaced walls, the outer wall of said closure being flanged to engage the outer wall of the casing and the inner wall of said closure being formed to engage the inner wall of the casing to position articles relative to said grooves, a tubular support mounted through said casing and extending through said closures, standards to receive the ends of the tubular support, one end of the tubular support being open, and a cap on the other end of the tubular support abutting the outer face of the other closure, registering openings through said cap and tubular support and a prong on one of the standards engageable through said openings to maintain the support against rotation while permitting rotation of the casing.

Signed at New York, in the county of New York and State of New York, this 16th day of February, A. D. 1931.

WILLIAM H. ROSS.